United States Patent
Park et al.

(10) Patent No.: US 9,219,731 B2
(45) Date of Patent: Dec. 22, 2015

(54) METHOD OF MANAGING USER LOG-IN TO CLOUD-BASED APPLICATION AND IMAGE FORMING APPARATUS PERFORMING THE METHOD

(71) Applicant: Samsung Electronics Co., Ltd, Suwon-si, Gyeonggi-do (KR)

(72) Inventors: Sang-hyun Park, Suwon-si (KR); Joong-mok Lee, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 64 days.

(21) Appl. No.: 13/950,514

(22) Filed: Jul. 25, 2013

(65) Prior Publication Data

US 2014/0259137 A1 Sep. 11, 2014

(30) Foreign Application Priority Data

Mar. 8, 2013 (KR) .................... 10-2013-0025248

(51) Int. Cl.
*H04L 29/06* (2006.01)
*G06F 3/12* (2006.01)
*H04N 1/44* (2006.01)

(52) U.S. Cl.
CPC ............ *H04L 63/083* (2013.01); *G06F 3/1204* (2013.01); *G06F 3/1271* (2013.01); *G06F 3/1285* (2013.01); *H04N 1/4426* (2013.01); *G06F 3/1222* (2013.01); *G06F 3/1238* (2013.01)

(58) Field of Classification Search
CPC ....... H04L 63/08; H04L 63/083; H04L 63/10; H04W 12/06; G06F 21/31
USPC ............................................................ 726/7
See application file for complete search history.

(56) References Cited

U.S. PATENT DOCUMENTS

| | | | | |
|---|---|---|---|---|
| 8,635,684 | B2 * | 1/2014 | Thun .............................. | 726/9 |
| 8,850,535 | B2 * | 9/2014 | Liberman et al. ................. | 726/6 |
| 2004/0145773 | A1 * | 7/2004 | Oakeson et al. ............. | 358/1.15 |
| 2005/0204158 | A1 * | 9/2005 | Tobe ............................. | 713/200 |
| 2006/0119883 | A1 * | 6/2006 | Lovat et al. ................. | 358/1.15 |
| 2008/0066168 | A1 * | 3/2008 | Gregg et al. ...................... | 726/7 |
| 2010/0212001 | A1 * | 8/2010 | Kashyap et al. ................. | 726/7 |
| 2011/0154467 | A1 * | 6/2011 | Bomar et al. ..................... | 726/9 |
| 2011/0265167 | A1 * | 10/2011 | Tsujimoto ......................... | 726/7 |
| 2012/0171999 | A1 * | 7/2012 | Im .................................. | 455/411 |
| 2012/0262749 | A1 * | 10/2012 | Yamamoto .................. | 358/1.14 |
| 2012/0331521 | A1 * | 12/2012 | Ansari ............................. | 726/3 |
| 2013/0003106 | A1 * | 1/2013 | Nishida et al. ............... | 358/1.14 |

OTHER PUBLICATIONS

Extended European Search Report issued in Application No. 13182878.2 on May 21, 2014.

* cited by examiner

*Primary Examiner* — Yonas Bayou
(74) *Attorney, Agent, or Firm* — Staas & Halsey LLP

(57) ABSTRACT

An image forming apparatus includes a communication interface unit to perform communication with a cloud server that provides an application service; a user interface unit to display a screen and receive a user input; a storage unit to store a database that corresponds to an application that is installed in the image forming apparatus; an image forming operation performing unit to perform an image forming operation; and a control unit that stores user log-in information in the database that corresponds to the application, so as to match the user log-in information with a user account for the image forming apparatus, and manages a log-in to a user account for the application by using the stored user log-in information.

20 Claims, 9 Drawing Sheets

METHOD OF MANAGING USER LOG-IN TO CLOUD-BASED APPLICATION AND IMAGE FORMING APPARATUS PERFORMING THE METHOD

CROSS-REFERENCE TO RELATED APPLICATIONS

This application claims the benefit of Korean Patent Application No. 10-2013-0025248, filed on Mar. 8, 2013, in the Korean Intellectual Property Office, the disclosure of which is incorporated herein in its entirety by reference.

BACKGROUND OF THE INVENTION

1. Field of the Invention

The present inventive concept relates to a method of managing, by an image forming apparatus, a log-in to a cloud-based application, and an image forming apparatus to perform the method.

2. Description of the Related Art

A cloud service indicates a service by which a user may store content, such as documents, music files, images, or the like, in a cloud server and then may download content to a device, such as a smartphone, or may upload at least one piece of content to the cloud server.

Recently, the cloud service has become widely used and thus may be used in various types of devices, and in particular, a multi-functional device enabled for network communication may use the cloud server through a cloud-based application installed therein. For example, an application, such as a Google Docs application, may be installed and executed in the multi-functional device, and then the multi-functional device may upload a document file, which is scanned by the multi-functional device, to the cloud server or may download a document that is stored in the cloud server and then may output the document.

In order to use the cloud-based application in the multi-functional device, the user has to log in to the multi-functional device via a multi-functional device account and then log in again via an account of an application. However, it is inconvenient for the user to be required to input text to repeat a log-in process whenever the user uses an application in the multi-functional device. Also, after the user logs into the multi-functional device, the user may want to easily use applications without separate log-in processes, and thus, there is an increasing demand for a technology capable of satisfying user needs.

SUMMARY OF THE INVENTION

The present inventive concept provides a method of managing, by an image forming apparatus, a log-in to a cloud-based application. The present invention also provides an image forming apparatus to perform the above described method.

Additional features and utilities of the present general inventive concept will be set forth in part in the description which follows and, in part, will be obvious from the description, or may be learned by practice of the general inventive concept.

Exemplary embodiments of the general inventive concept provide an image forming apparatus including a communication interface unit to perform communication with a cloud server that provides an application service; a user interface unit to display a screen and receive a user input; a storage unit to store a database that corresponds to an application that is installed in the image forming apparatus; an image forming operation performing unit to perform an image forming operation; and a control unit, wherein the control unit stores user log-in information in the database that corresponds to the application, so as to match the user log-in information with a user account for the image forming apparatus, and manages a log-in to a user account for the application by using the stored user log-in information.

The control unit may include a user log-in information managing unit to receive a token from the cloud server and store the token in the user log-in information that matches with the user account for the image forming apparatus, when the user, who logs in to the user account for the image forming apparatus, logs in to the user account for the application; and a log-in maintenance managing unit to maintain the log-in to the user account for the application by periodically transmitting the token that is stored in the user log-in information to the cloud server.

Exemplary embodiments of the general inventive concept also provide a method of managing a log-in to a cloud-based application, the method including operations of receiving an application execution command related to the cloud-based application from a user who logs in to a user account for an image forming apparatus; storing user log-in information in a database that corresponds to the cloud-based application, so as to match the user log-in information with the user account for the image forming apparatus; and managing the log-in to a user account for the cloud-based application by using the stored user log-in information.

The operation of storing of the user log-in information may include operations of receiving a token from a cloud server that provides a service of the cloud-based application, when the user logs in to the user account for the cloud-based application; and storing the token in the user log-in information.

The operation of managing the log-in may include an operation of maintaining the log-in to the user account for the cloud-based application by periodically transmitting the token that is stored in the user log-in information to the cloud server.

Exemplary embodiments of the general inventive concept also provide a method of managing a log-in to a cloud-based application, the method including operations of receiving an application execution command related to the cloud-based application from a user who logs in to a user account for an image forming apparatus; checking user log-in information that matches the user account for the image forming apparatus and that is stored in a database that corresponds to the cloud-based application; and managing the log-in to a user account for the cloud-based application by using the stored user log-in information.

Exemplary embodiments of the general inventive concept also provide an image forming apparatus that communicates with a cloud server which provides application services, the image forming apparatus comprising: a user interface unit to display a screen and receive a user input; a storage unit to store databases that correspond to respective applications that are installed in the image forming apparatus; and a control unit to store user log-in information in the databases corresponding to the respective applications, so as to match the user log-in information with a user account for the image forming apparatus, and to manage a log-in to a user account for each application by using the stored user log-in information.

In an exemplary embodiment, the control unit comprises: a user log-in information managing unit to receive a token from the cloud server and store the token in the user log-in information that matches with the user account for the image forming apparatus, when the user, who logs into the user account for the image forming apparatus, logs into a user account for one of the applications; and a log-in maintenance managing unit to maintain the log-in status to the user account for the application by periodically transmitting the token that is stored in the user log-in information to the cloud server.

In an exemplary embodiment, when the control unit receives an application execution command from the user who logs into the user account for the image forming apparatus, the control unit checks the user log-in information that matches the user account for the image forming apparatus from the database that corresponds to the application, and when the user log-in information includes a token, the control unit displays an application execution screen on the user interface unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
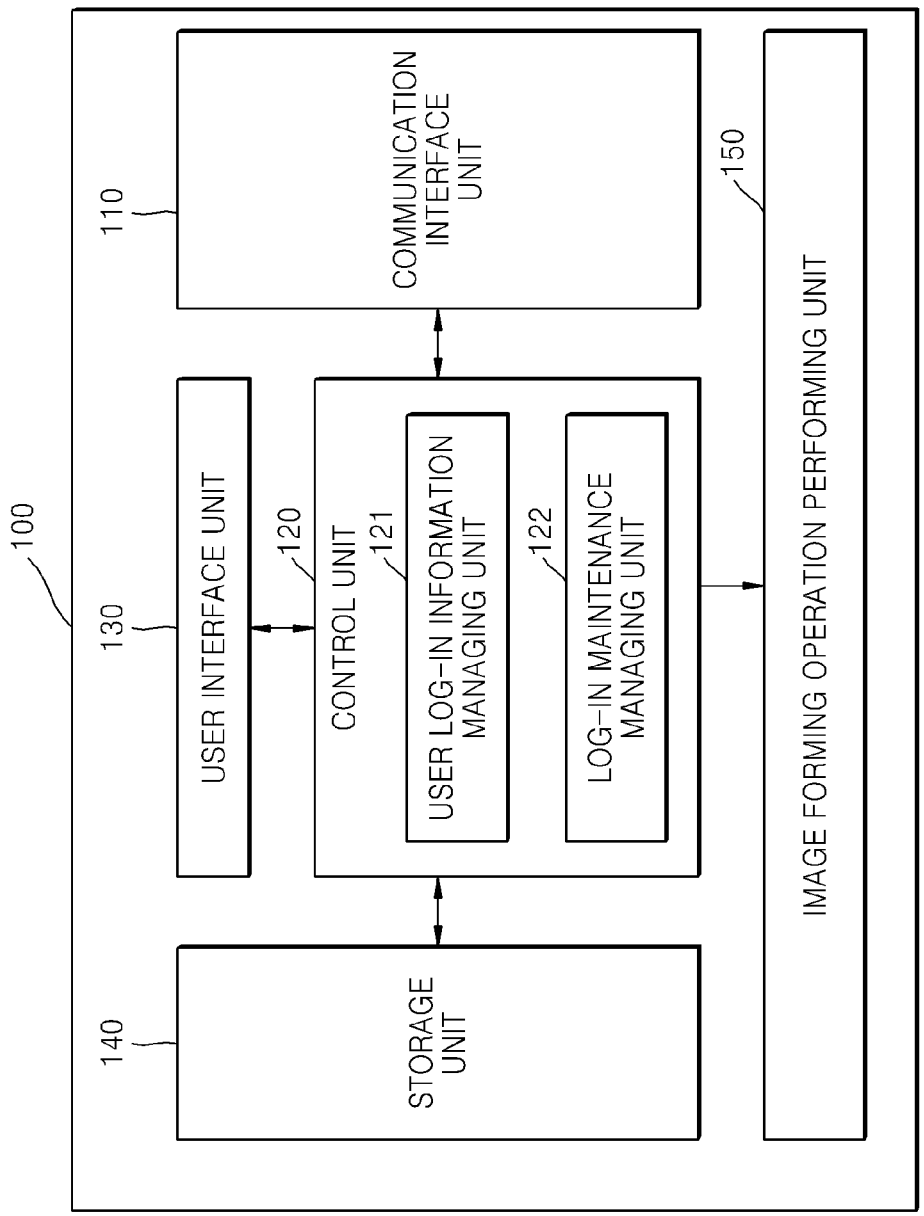
FIG. 1 illustrates a structure of an image forming apparatus according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates a structure of an image forming apparatus 100 according to an embodiment of the present inventive concept. Referring to FIG. 1, the image forming apparatus 100 may include a communication interface unit 110, a control unit 120, a user interface unit 130, a storage unit 140, and an image forming operation performing unit 150. Also, the control unit 120 may include a user log-in information managing unit 121 and a log-in maintenance managing unit 122.

Before each element of the image forming apparatus 100 is described, first, a cloud-based application is briefly described.

The cloud-based application indicates an application providing a cloud service. Examples of the cloud-based application include a Google Docs application, a Google Calendar application, an Office 365 application, or the like. For example, a user may store a file, such as a document, in a cloud server via a device, such as a computer or a smartphone, in which the Google Docs application is installed, and may download the file at the device from the cloud server when the user needs it.

Also, the cloud service may be used in an image forming apparatus, such as a multi-function printer (MFP). For example, the user may install and execute the Google Docs application in the MFP and then may upload a document, which is scanned by the MFP, to the cloud server or may download a document that is stored in the cloud server and output the downloaded document via the MFP in any of the forms in which an MFP outputs a document, including printing the document, faxing the document, etc.

Referring back to FIG. 1, elements of the image forming apparatus 100 will now be described in detail.

The communication interface unit 110 performs communication with a cloud server that provides a cloud-based application service. That is, the communication interface unit 110 exchanges data with the cloud server via a wired or a wireless communication, so that the communication interface unit 110 transmits data, which is uploaded by a user, to the cloud server, or receives user-target data from the cloud server and then provides it to the user.

The user interface unit 130 may display a screen to the user and may receive an application execution command or the like from the user. For example, the user interface unit 130 may display a list of applications installed in the image forming apparatus 100 on a display panel, such as a touch screen that is enabled to receive a touch input, and then the user may select an application to be executed by touching the application on the touch screen. Also, in a case of a user log-in, a user identification (ID) and a password may be input via the user interface unit 130, and since it is difficult for the image forming apparatus 100 to have a separate input device, such as a computer keyboard, due to spatial limitations, the input may be performed via the touch screen. In general, the input of text, such as the user ID and the password, via a user interface unit may be rather inconvenient.

The image forming operation performing unit 150 may perform an image forming operation according to a control by the control unit 120, and in particular, the image forming operation performing unit 150 may perform an application-based operation by downloading the document file stored in the cloud server and then printing the document file or outputting the document file in another form in which an MFP outputs a document file.

The control unit 120 controls an operation that is performed by using the cloud-based application, and manages a log-in to a user account for an application. Operations of the control unit 120 are described in detail with reference to examples below.

The storage unit 140 may store a plurality of databases that correspond to applications, respectively, which are installed in the image forming apparatus 100. The image forming apparatus 100 may arrange respective databases for respective applications, and store a plurality of pieces of user log-in information that match the applications, respectively, in the databases that correspond to the applications, respectively. Also, the control unit 120 manages the log-in to the user account for the application by using one of the plurality of pieces of stored user log-in information. That is, the databases that correspond to the applications, respectively, store the plurality of pieces of user log-in information that match user accounts for the image forming apparatus 100, respectively.

Here, the user log-in information may be required to manage the log-in to the user account for the application and may include a token that is received from the cloud server when the log-in to the user account for the application is successful. Here, the user log-in information may include only the token, or may include the token and also a user ID and a password for the user account for the application. The token that is stored in the user log-in information may be stored after being encrypted for security.

For example, in a case where the Google Docs and Google Calendar applications are installed in the image forming apparatus 100, a database that corresponds to the Google Docs application and a database that corresponds to the Google Calendar application are separately arranged and stored in the storage unit 140.

If a first user, whose user ID for a user account for the image forming apparatus 100 is "user1," logs into the image forming apparatus 100, executes the Google Docs application, and then logs into a user account for the Google Docs application, the image forming apparatus 100 receives a token via the communication interface unit 110 from a cloud server that provides a Google Docs service. Afterward, a space that corresponds to "user1" is generated in the database that corresponds to the Google Docs application, and then the token from the cloud server is stored in the generated space. Here, the token that is stored to match "user1" corresponds to the user log-in information.

Also, if a second user, whose user ID for a user account for the image forming apparatus 100 is "user2," logs into the image forming apparatus 100, executes the Google Calendar application, and then logs into a user account for the Google Calendar application, the image forming apparatus 100 receives a token via the communication interface unit 110 from a cloud server that provides a Google Calendar service. Afterward, a space that corresponds to "user2" is generated in the database that corresponds to the Google Calendar application, and then the token from the cloud server is stored in the generated space. Here, the token that is stored to match "user2" corresponds to the user log-in information.

As described above, a user ID and a password for a user account for an application of the user may be encrypted and stored in the user log-in information. That is, the first user's user ID and password for the user account for the Google Docs application may be encrypted with the token and may be stored in the space of "user1" in the database that corresponds to the Google Docs application. Also, the second user's user ID and password for the user account for the Google Calendar application may be encrypted with the token and may be stored in the space of "user2" in the database that corresponds to the Google Calendar application.

The storage of the user log-in information is performed by the user log-in information managing unit 121 in the control unit 120, and the log-in maintenance managing unit 122 manages a log-in to a user account for an application by using user log-in information that is stored in a database that corresponds to the application.

In more detail, the log-in maintenance managing unit 122 periodically transmits a token, which is included in the user log-in information, to a cloud server so that the log-in maintenance managing unit 122 maintains the log-in to the user account for the application. In the aforementioned two examples, the log-in maintenance managing unit 122 periodically transmits the token, which is stored to match "user1" in the database that corresponds to the Google Docs application, to the cloud server that provides the Google Docs service, so that the log-in maintenance managing unit 122 allows the first user to maintain the log-in status to the user account for the Google Docs application.

Also, the log-in maintenance managing unit 122 periodically transmits the token, which is stored to match "user2" in the database that corresponds to the Google Calendar application, to the cloud server that provides the Google Calendar service, so that the log-in maintenance managing unit 122 allows the second user to maintain the log-in status to the user account for the Google Calendar application.

The log-in maintenance managing unit 122 maintains the log-in status to the user account for the application by periodically transmitting the token to the cloud server, unless the user intentionally logs out from the user account for the application. Also, although the user may log out from the user account for the image forming apparatus 100, the log-in maintenance managing unit 122 periodically transmits the token to the cloud server, thereby allowing the user to maintain the log-in status to the user account for the application.

Thus, once the user logs into the user account for the application, although the user logs out from the user account for the image forming apparatus 100 and then logs in again to the user account for the image forming apparatus 100, the user may maintain the log-in status to the user account for the application. Also, unless the user intentionally logs out from the user account for the application, the user may maintain the log-in status to the user account for the application, regardless of an elapsed time from a point of time when the user last used the application.

In conclusion, once the user logs into the user account for the application, the user may directly use the application without performing a log-in again to that application, so that user convenience is improved.

When the user inputs an application execution command while the user does not log into the user account for the application, the control unit 120 may automatically perform the log-in to the user account for the application. To do so, it is required for the user log-in information to include the user ID and the password for the user account for the application.

In more detail, for example, when the user that logs into the user account for the image forming apparatus 100 logs into a user account for the Google Docs application, the user log-in information managing unit 121 stores a user ID and a password for the user account for the Google Docs application, and also stores a token from the cloud server in the user log-in information that matches the user account for the image forming apparatus 100 in the database that corresponds to the Google Docs application. Afterward, if the user intentionally logs out from the user account for the Google Docs application, the token that is stored in the user log-in information is deleted. That is, only the user ID and the password for the user account for the Google Docs application remain in the user log-in information. Thus, after the user logs out from the user account for the Google Docs application, if the user executes the Google Docs application, the control unit 120 may transmit the user ID and the password that are stored in the user log-in information to the cloud server, and thus may automatically perform the log-in to the Google Docs application.

As described above, when the user who logged in and then logged out from the user account for the application executes the application, the log-in to the user account for the application is automatically performed by using the user log-in information, so that the user may skip a vexatious log-in process.

FIGS. 2 through 5 illustrate operations that are performed in the image forming apparatus 100 and a cloud server 200 when a method of managing a log-in to a cloud-based application is performed, according to embodiments of the present inventive concept. Hereinafter, the method of managing a log-in to a cloud-based application is described in detail with reference to FIGS. 2 through 5.

Figure 2:
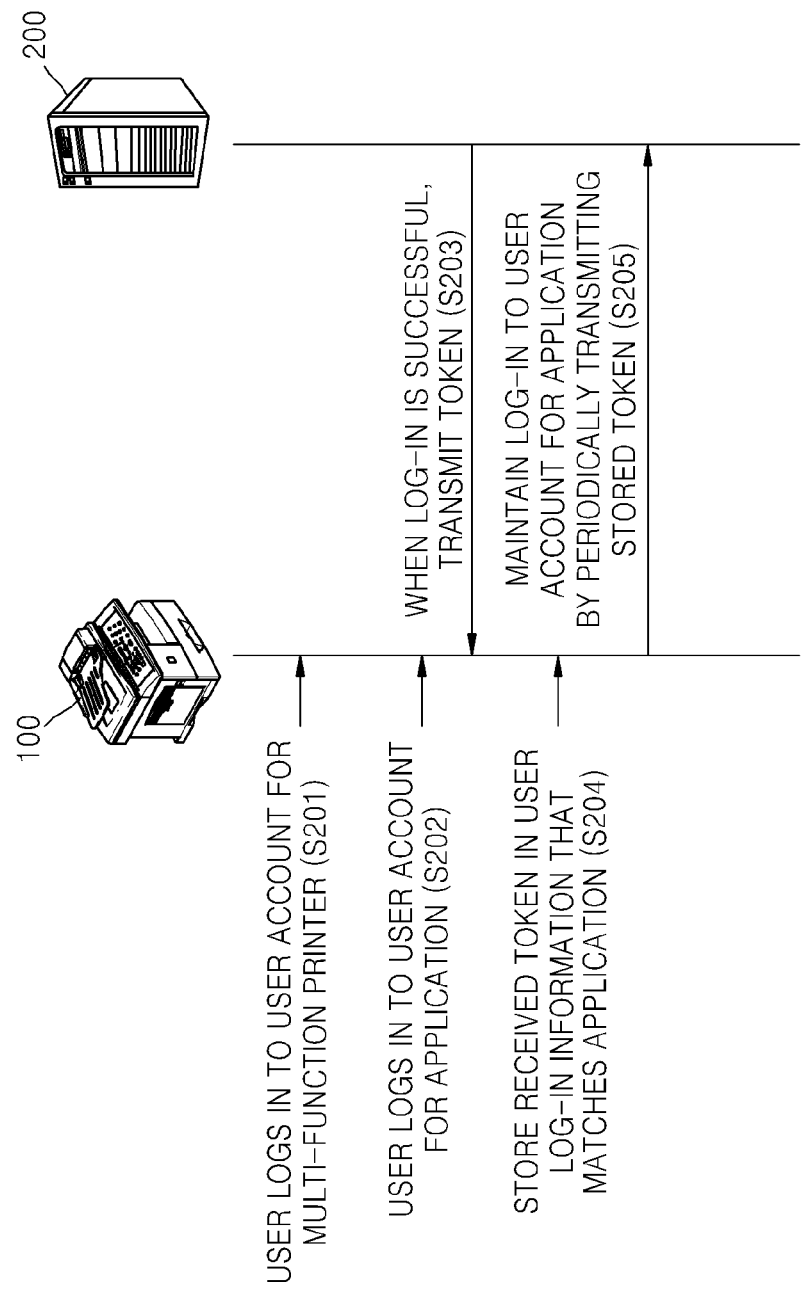
FIGS. 2 through 5 illustrate operations that are performed in the image forming apparatus and a cloud server when a method of managing a log-in to a cloud-based application is performed, according to embodiments of the present inventive concept.

Referring to FIG. 2, in operation S201, a user logs into a user account for the image forming apparatus 100, and then, in operation S202, the user logs into a user account for an application. When the log-in to the user account for the application is successful, in operation S203, the cloud server 200 transmits a token to the image forming apparatus 100. When the image forming apparatus 100 receives the token from the cloud server 200, in operation S204, the image forming apparatus 100 stores the token in user log-in information that is stored in a database corresponding to the application. Here, the token is stored in the user log-in information that matches the user account for the image forming apparatus 100.

After the token is stored in the user log-in information, in operation S205, the image forming apparatus 100 periodically transmits the token in the user log-in information to the cloud server 200, thereby allowing the user to maintain the log-in to the user account for the application. Although the user logs out from the user account for the image forming apparatus 100, the image forming apparatus 100 periodically transmits the token in the user log-in information to the cloud server 200, thereby allowing the user to maintain the log-in status to the user account for the application. Also, regardless of an elapsed time from a point of time when the user last used the application, the image forming apparatus 100 periodically transmits the token to the cloud server 200, thereby allowing the user to maintain the log-in status to the user account for the application.

However, if the user intentionally logs out from the user account for the application, the token is deleted from the user log-in information and the transmission of the token no longer occurs.

Figure 3:
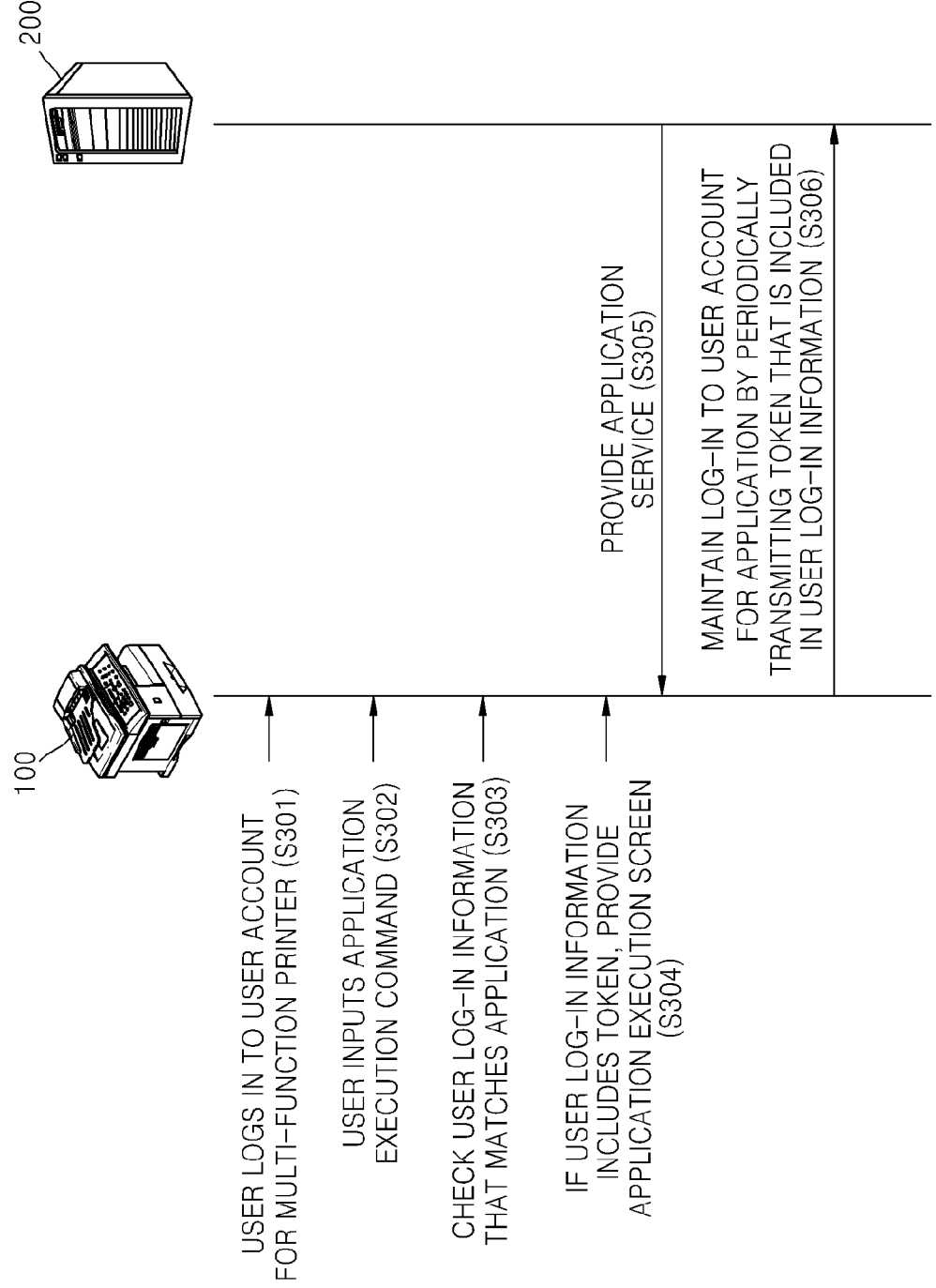

Referring to FIG. 3, in operation S301, a user logs into a user account for the image forming apparatus 100, and then, in operation S302, the user inputs an application execution command. In operation S303, the image forming apparatus 100 checks user log-in information in a database that corresponds to an application. That is, the image forming apparatus 100 checks the user log-in information, which corresponds to the user account for the image forming apparatus 100, from the database that corresponds to the application for which the application execution command is input.

If a token is included in the checked user log-in information, it means that a user's log-in to a user account for the application is maintained, and thus, in operation S304, an application execution screen is displayed to the user. Then, in operation S305, the cloud server 200 provides an application service according to a user input, and although a use of the application has ended, in operation S306, the image forming apparatus 100 periodically transmits the token included in the user log-in information to the cloud server 200, thereby maintaining the log-in status to the user account for the application.

Figure 4:
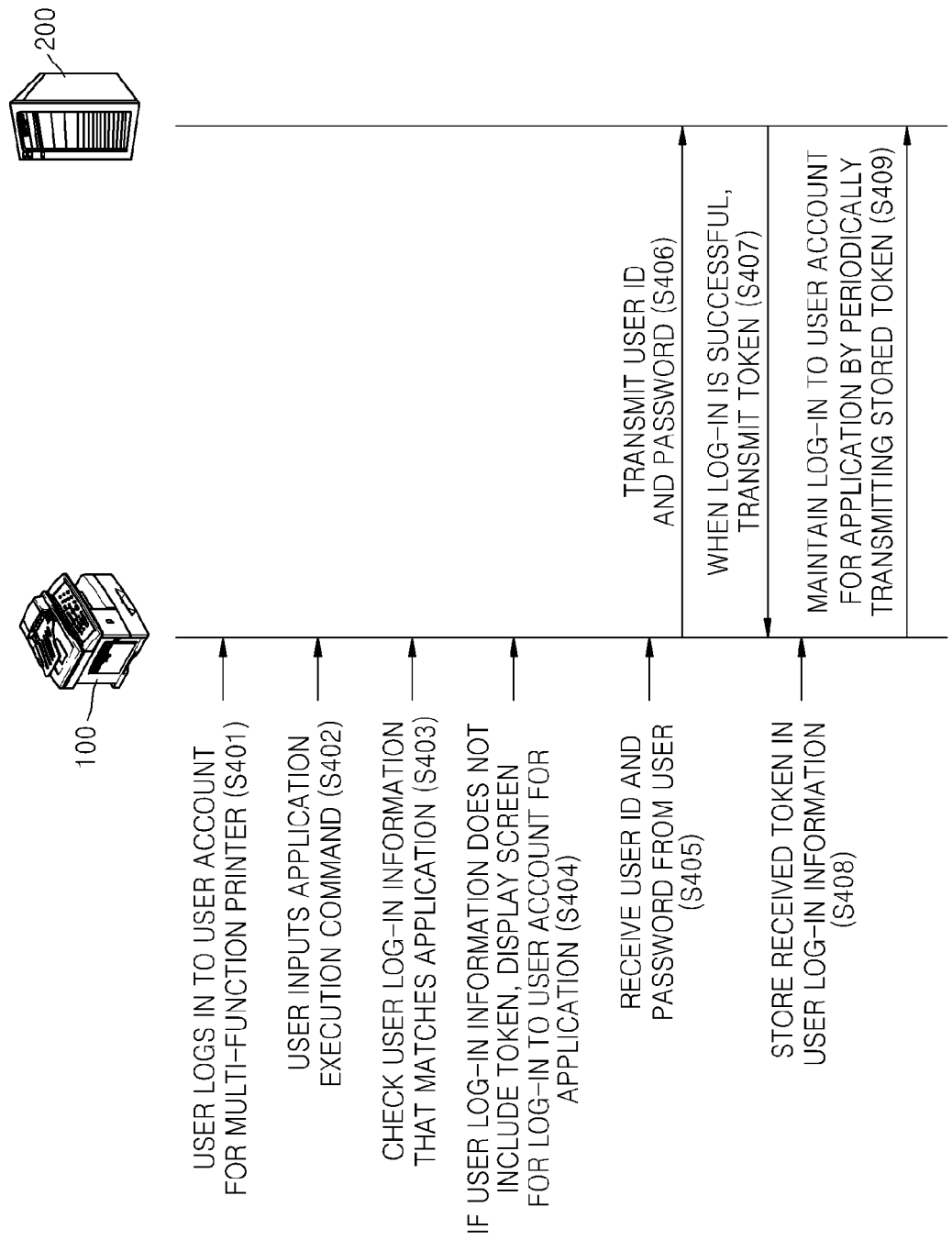

Referring to FIG. 4, in operation S401, a user logs into a user account for the image forming apparatus 100, and then, in operation S402, the user inputs an application execution command. In operation S403, the image forming apparatus 100 checks user log-in information in a database that corresponds to an application. That is, the image forming apparatus 100 checks the user log-in information, which corresponds to the user account for the image forming apparatus 100, from the database that corresponds to the application for which the application execution command is input.

If a token is not included in the checked user log-in information, it means that a user's log-in to a user account for the application has not been maintained, and thus, in operation S404, a screen for a log-in to the user account for the application is displayed to the user. In operation S405, the image forming apparatus 100 waits to receive a user ID and a password from the user, and in operation S406 after the user ID and password have been received, the image forming apparatus 100 attempts an automatic log-in by transmitting the received user ID and the password to the cloud server 200. When the log-in is successful (user ID and password are correct), in operation S407, the cloud server 200 transmits the token to the image forming apparatus 100, and in operation S408, the image forming apparatus 100 stores the received token in the user log-in information. In operation S409, the image forming apparatus 100 periodically transmits the token that is stored in the user log-in information to the cloud server 200, thereby maintaining the log-in status to the user account for the application.

Although the user logs out from the user account for the image forming apparatus 100, the image forming apparatus 100 periodically transmits the token in the user log-in information to the cloud server 200, thereby maintaining the log-in status to the user account for the application. Also, regardless of an elapsed time from a point of time when the user last used the application, the image forming apparatus 100 periodically transmits the token to the cloud server 200, thereby maintaining the log-in status to the user account for the application.

Figure 5:
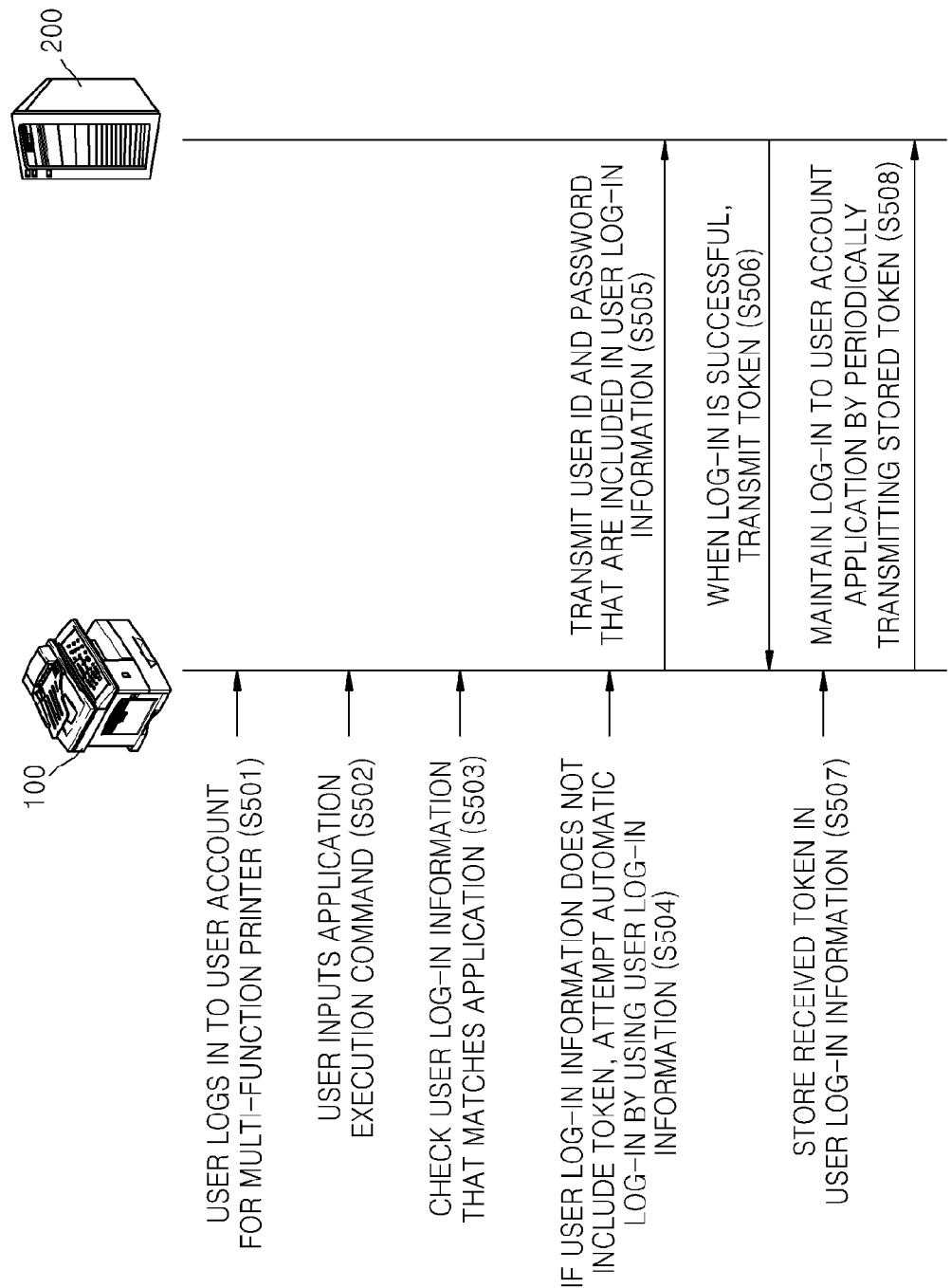

Referring to FIG. 5, in operation S501, a user logs into a user account for the image forming apparatus 100, and then, in operation S502, the user inputs an application execution command. In operation S503, the image forming apparatus 100 checks user log-in information in a database that corresponds to an application. That is, the image forming apparatus 100 checks the user log-in information, which corresponds to the user account for the image forming apparatus 100, from the database that corresponds to the application for which the application execution command is input.

If a token is not included in the checked user log-in information, it means that a user's log-in to a user account for the application has not been maintained, and thus, in operation S504, the image forming apparatus 100 attempts an automatic log-in to the user account for the application by using the user log-in information. Thus, in operation S505, the image forming apparatus 100 transmits a user ID and a password that are included in the user log-in information to the cloud server 200, and when the log-in is successful, in operation S506, the cloud server 200 transmits the token to the image forming apparatus 100.

In operation S507, the image forming apparatus 100 stores the received token in the user log-in information, and in operation S508, the image forming apparatus 100 periodically transmits the token that is included in the user log-in information to the cloud server 200, thereby maintaining the log-in to the user account for the application.

FIGS. 6 through 9 are flowcharts of a method of managing a log-in to a cloud-based application, according to exemplary embodiments of the present inventive concept. Hereinafter, the method of managing a log-in to a cloud-based application according to exemplary embodiments is described in detail with reference to FIGS. 6 through 9.

Figure 6:
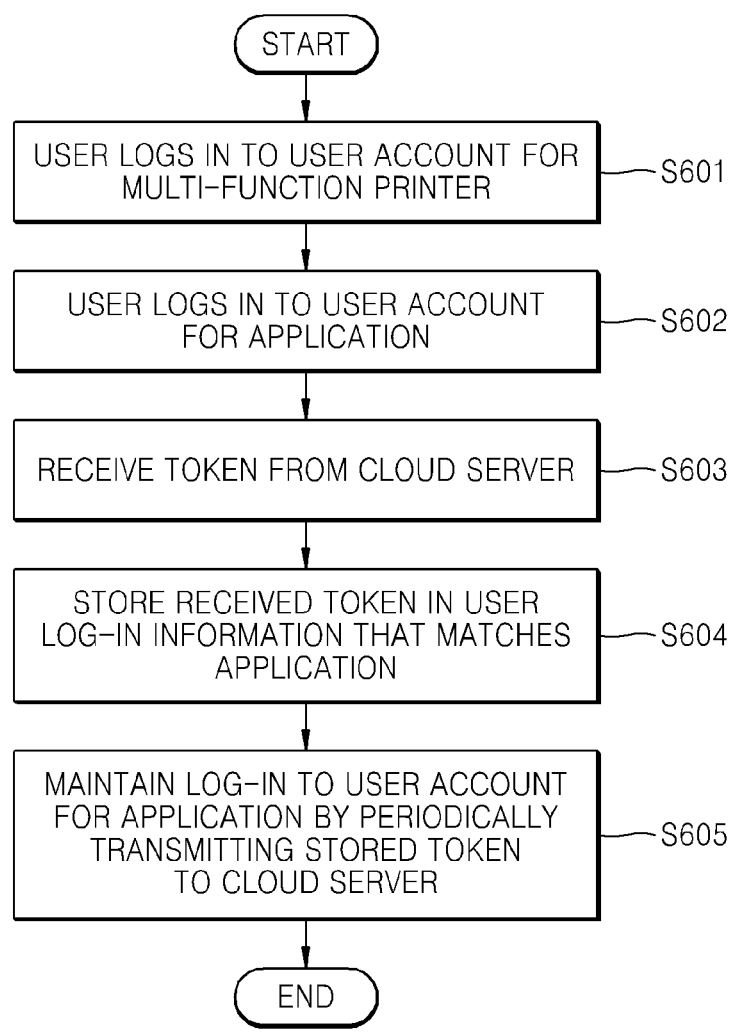
FIGS. 6 through 9 are flowcharts of a method of managing a log-in to a cloud-based application, according to embodiments of the present inventive concept.

Referring to FIG. 6, in operation S601, a user logs into a user account for a multi-function printer (MFP), and then, in operation S602, the user logs into a user account for an application. When the log-in to the user account for the application is successful, in operation S603, the MFP receives a token from a cloud server. In operation S604, the MFP stores the token in user log-in information in a database that corresponds to the application, and in operation S605, the MFP periodically transmits the token that is stored in the user log-in information to the cloud server, thereby maintaining the log-in status to the user account for the application.

Although the user logs out from the user account for the MFP, the MFP periodically transmits the token in the user log-in information to the cloud server, thereby maintaining the log-in status to the user account for the application. Also, regardless of an elapsed time from a point of time when the user last used the application, the MFP periodically transmits the token to the cloud server, thereby maintaining the log-in status to the user account for the application.

As described above, unless the user intentionally logs out from the user account for the application, the log-in status to the user account for the application is maintained, so that once the user logs into the user account for the application, the user may directly use the application without being required to perform a log-in process again.

Figure 7:
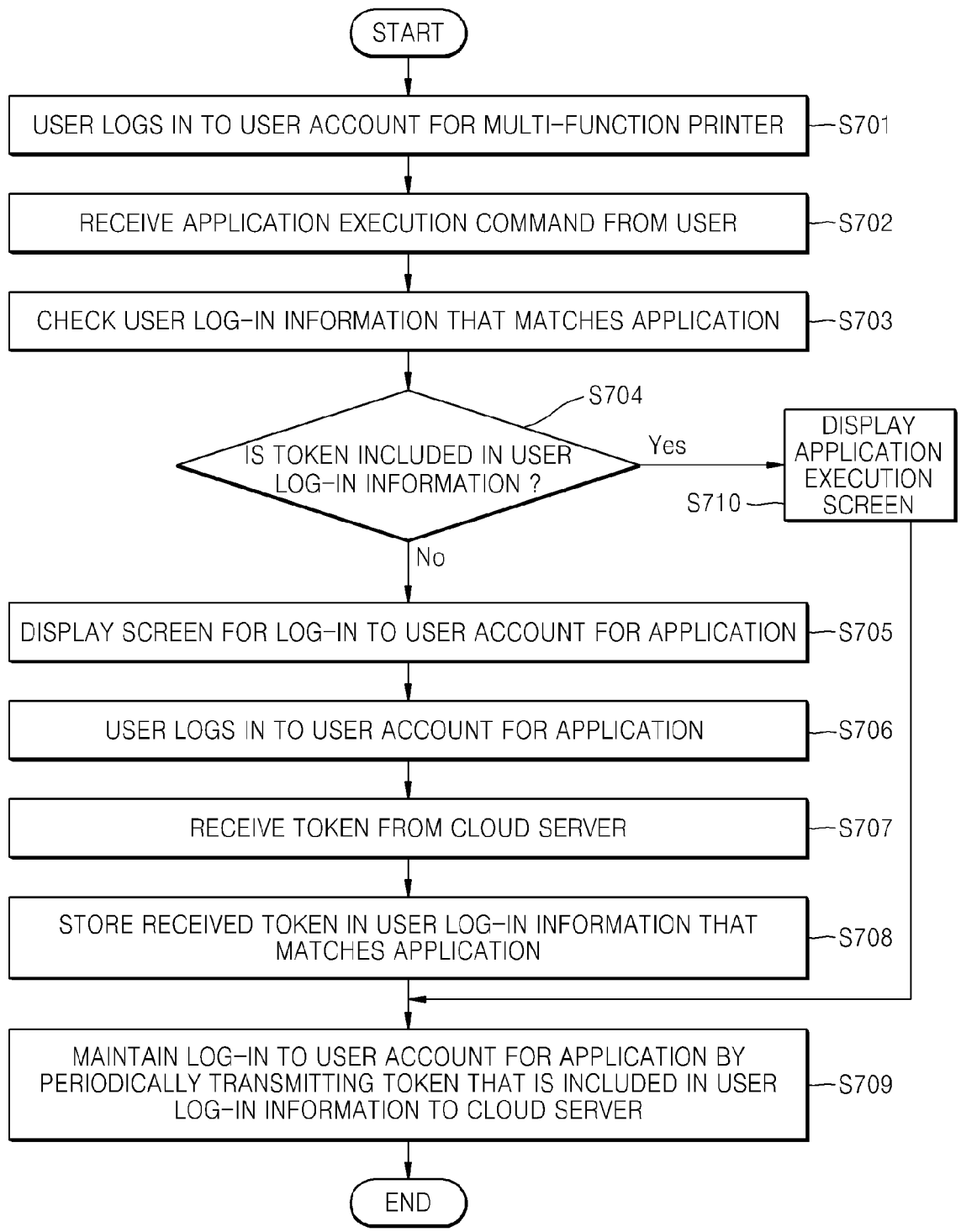

Referring to FIG. 7, in operation S701, a user logs into a user account for a MFP. After the user logs into the user account for the MFP, in operation S702, the user inputs an execution command to execute an application that is installed in the MFP, via a user interface unit of the MFP. After the MFP receives the execution command to execute the application, in operation S703, the MFP checks user log-in information in a database that corresponds to the application. In operation S704, as a result of checking whether the user log-in information includes a token, if the token is included, the method proceeds to operation S710, in which the MFP displays an application execution screen on a display unit.

However, in operation S704, as a result of the checking, if the user log-in information does not include the token, the method proceeds to operation S705, in which the MFP displays a screen for a log-in to a user account for the application on the display unit. In operation S706, the user logs into the user account for the application by inputting a correct user ID and a password. When the log-in is successful (correct ID and password), in operation S707, the MFP receives a token from a cloud server, and then in operation S708, the MFP stores the received token in the user log-in information in the database that corresponds to the application. In operation S709, the MFP periodically transmits the token that is included in the user log-in information to the cloud server, thereby maintaining the log-in to the user account for the application.

Figure 8:
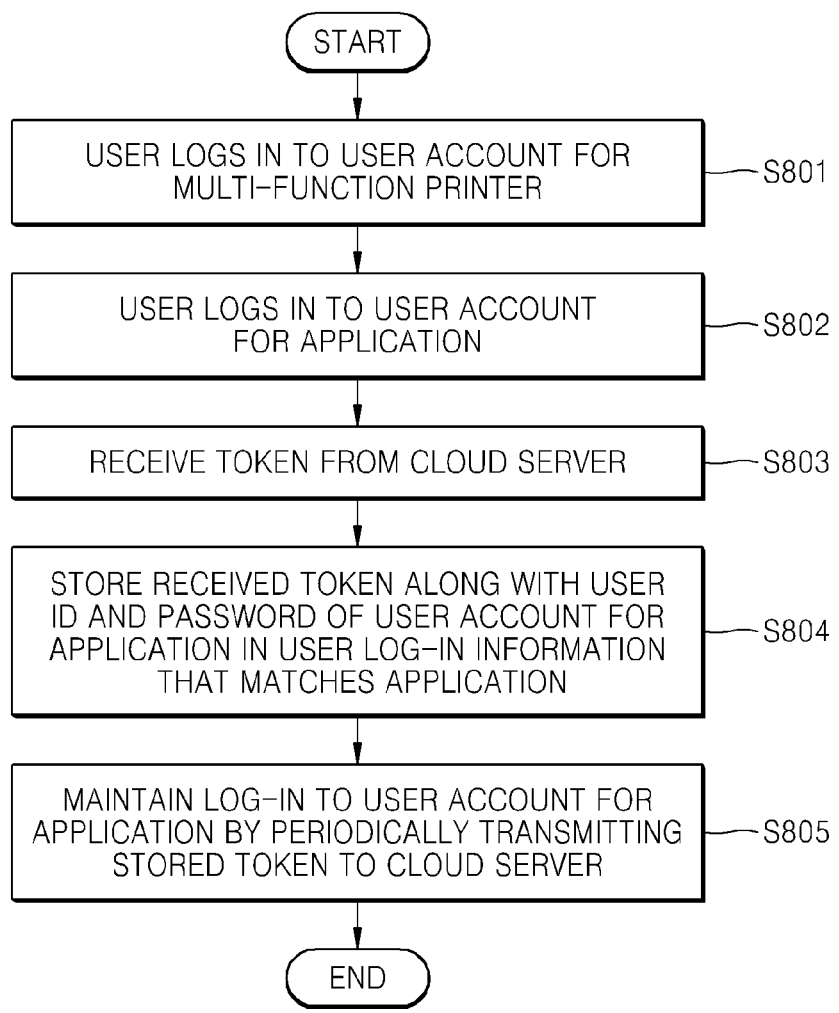

Referring to FIG. 8, in operation S801, a user logs into a user account for a MFP, and then, in operation S802, the user logs into a user account for an application. When the log-in to the user account for the application is successful, in operation S803, the MFP receives a token from a cloud server. In operation S804, the MFP stores a user ID and a password of the user of the user account for the application, and the received token in user log-in information in a database that corresponds to the application, and in operation S805, the MFP periodically transmits the token that is stored in the user log-in information to the cloud server, thereby maintaining the log-in to the user account for the application.

Although the user logs out from the user account for the MFP, the MFP periodically transmits the token in the user log-in information to the cloud server, thereby maintaining the log-in status to the user account for the application. Also, regardless of an elapsed time from a point of time when the user last used the application, the MFP periodically transmits the token to the cloud server, thereby maintaining the log-in status to the user account for the application.

As described above, unless the user intentionally logs out from the user account for the application, the log-in status to the user account for the application is maintained, so that once the user logs in to the user account for the application, the user may directly use the application without being required to perform a log-in process again.

Figure 9:
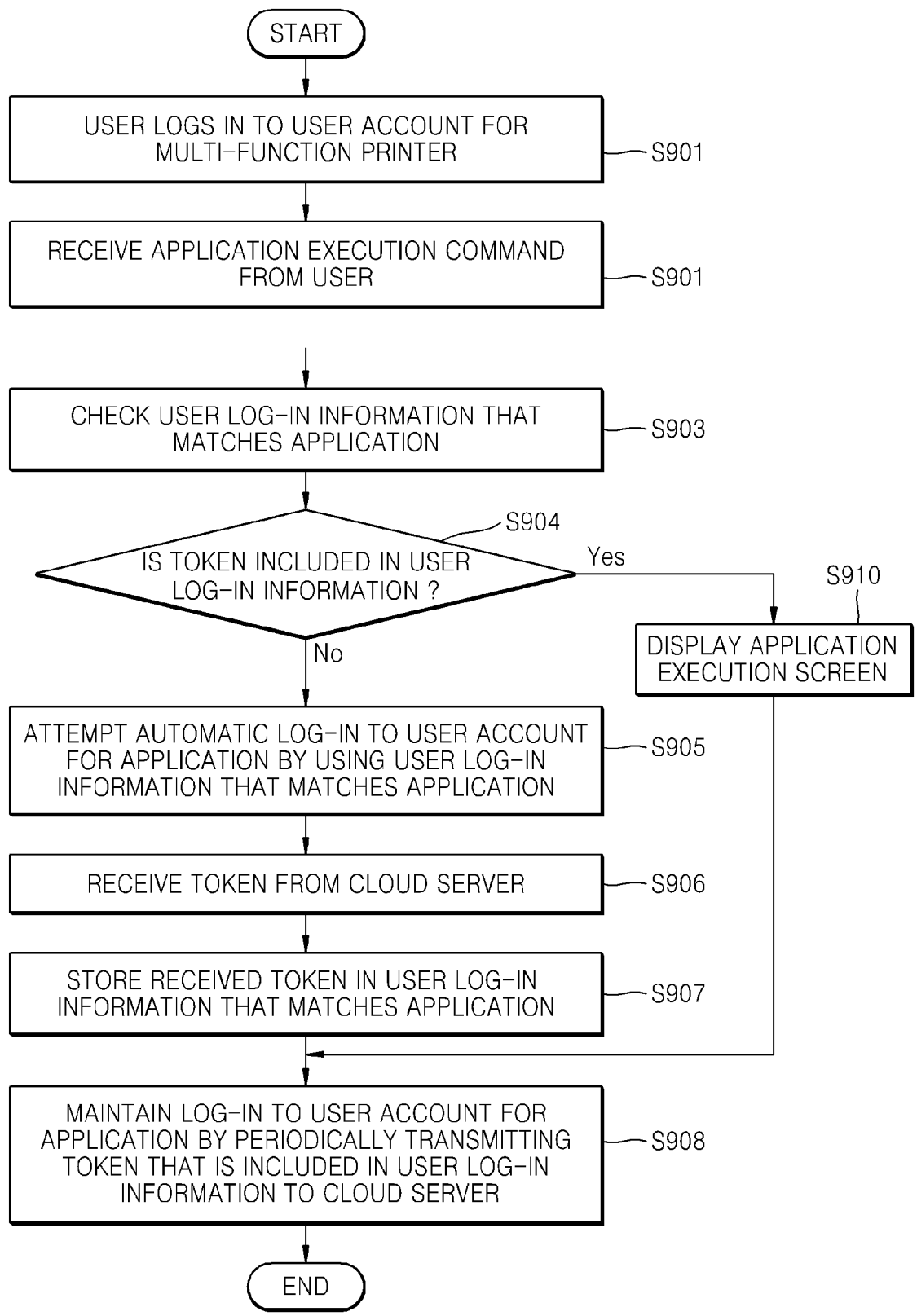

Referring to FIG. 9, in operation S901, a user logs into a user account for a MFP. After the user logs into the user account for the MFP, in operation S902, the user inputs an execution command to execute an application that is installed in the MFP, via a user interface unit of the MFP. After the MFP receives the execution command to execute the application, in operation S903, the MFP checks user log-in information in a database that corresponds to the application. In operation S904, as a result of checking whether the user log-in information includes a token, if the token is included, the method proceeds to operation S910, in which the MFP displays an application execution screen on a display unit.

However, in operation S904, as a result of the checking, if the user log-in information does not include the token, the method proceeds to operation S905, in which the MFP automatically attempts a log-in to a user account for the application by using the user log-in information. That is, the MFP transmits the user ID and the password that are included in the user log-in information to the cloud server. If the log-in is successful, in operation S906, the MFP receives a token from the cloud server. Then, in operation S907, the MFP stores the received token in the user log-in information, and in operation S908, the MFP periodically transmits the token that is included in the user log-in information to the cloud server, thereby maintaining the log-in to the user account for the application.

As described above, when the user who logged in and then logged out from the user account for the application executes the application, the log-in to the user account for the application is automatically performed by using the user log-in information, so that the user may skip a vexatious log-in process.

According to exemplary embodiments of the present inventive concept, the image forming apparatus stores the user log-in information in the database that corresponds to the application installed in the image forming apparatus, so as to match the user log-in information with a user account for the image forming apparatus, and then the image forming apparatus maintains the log-in to the user account for the application by using the stored user log-in information, so that the user may directly use the application in the image forming apparatus without a vexatious log-in process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming apparatus comprising:
   a communication interface unit to perform communication with a cloud server that provides an application service;
   a user interface unit to display a screen and receive a user input;
   a storage unit to store a database that corresponds to an application that is installed in the image forming apparatus;
   an image forming operation performing unit to perform an image forming operation;
   a control unit, wherein the control unit stores user log-in information in the database that corresponds to the application, so as to match the user log-in information with a user account for the image forming apparatus, and manages a log-in to a user account for the application by using the stored user log-in information;
   a user log-in information managing unit to receive a token from the cloud server, encrypt the token for security, and store the encrypted token in the user log-in information that matches with the user account for the image forming apparatus, when the user, who logs into the user account for the image forming apparatus, logs into the user account for the application, and
   a log-in maintenance managing unit to maintain the log-in status to the user account for the application by periodi- cally transmitting the token that is stored in the user log-in information to the cloud server.

2. The image forming apparatus of claim 1, wherein, when the control unit receives an application execution command from the user who logs into the user account for the image forming apparatus, the control unit checks the user log-in information that matches the user account for the image forming apparatus from the database that corresponds to the application, and when the user log-in information includes a token, the control unit displays an application execution screen on the user interface unit.

3. The image forming apparatus of claim 1, wherein, unless the user intentionally logs out from the user account for the application, the log-in maintenance managing unit maintains the log-in status to the user account for the application by periodically transmitting the token that is stored in the user log-in information to the cloud server.

4. The image forming apparatus of claim 1, wherein, although the user logs out from the user account for the image forming apparatus, the log-in maintenance managing unit maintains the log-in status to the user account for the application by periodically transmitting the token that is stored in the user log-in information to the cloud server.

5. The image forming apparatus of claim 1, wherein, when the user logs out from the user account for the application, the user log-in information managing unit deletes the user log-in information that corresponds to the user account for the image forming apparatus.

6. The image forming apparatus of claim 1, wherein the user log-in information managing unit stores the token along with a user identification (ID) and a password for the user account for the application in the user log-in information.

7. The image forming apparatus of claim 6, wherein, when the control unit receives an application execution command from the user who logs into the user account for the image forming apparatus, the control unit checks the user log-in information that matches the user account for the image forming apparatus from the database that corresponds to the application, and when the user log-in information does not include a token, the control unit transmits the user ID and the password that are stored in the user log-in information to the cloud server.

8. The image forming apparatus of claim 7, wherein, when the database that corresponds to the application does not store user log-in information, the control unit provides a screen for a log-in to a user account for the application to the user.

9. The image forming apparatus of claim 8, wherein, when the control unit receives the user ID and the password from the user, transmits the user ID and the password to the cloud server, and then succeeds in the log-in, the control unit receives a token from the cloud server and stores the user ID, the password, and the received token in the user log-in information.

10. The image forming apparatus of claim 1, wherein a user ID and a password are encrypted along with the token.

11. A method of managing a log-in to a cloud-based application, the method comprising:
    receiving an application execution command related to the cloud-based application from a user who logs into a user account for an image forming apparatus;
    storing user log-in information in a database that corresponds to the cloud-based application, so as to match the user log-in information with the user account for the image forming apparatus;
    managing the log-in to a user account for the cloud-based application by using the stored user log-in information;
    when the user logs into the user account for the cloud-based application, receiving a token from a cloud server that provides a service of the cloud-based application, and encrypting the token for security;
    wherein the storing of user log-in information comprises storing the encrypted token in the user log-in information, and
    wherein the managing of the log-in comprises maintaining the log-in to the user account for the cloud-based application by periodically transmitting the token that is stored in the user log-in information to the cloud server.

12. The method of claim 11, wherein the managing of the log-in comprises maintaining the log-in to the user account for the cloud-based application by periodically transmitting the token to the cloud server unless the user intentionally logs out from the user account for the cloud-based application.

13. The method of claim 11, wherein the managing of the log-in comprises maintaining the log-in to the user account for the cloud-based application by periodically transmitting the token to the cloud server although the user logs out from the user account for the image forming apparatus.

14. A method of managing a log-in to a cloud-based application, the method comprising:
    receiving an application execution command related to the cloud-based application from a user who logs into a user account for an image forming apparatus;
    checking user log-in information that matches the user account for the image forming apparatus and that is stored in a database that corresponds to the cloud-based application;
    managing the log-in to a user account for the cloud-based application by using the stored user log-in information;
    upon receiving a token from a cloud server, encrypting the token;
    wherein the storing of user log-in information comprises storing the encrypted token in the user log-in information, and
    wherein the managing of the log-in comprises maintaining the log-in to the user account for the cloud-based application by periodically transmitting the token that is stored in the user log-in information to the cloud server.

15. The method of claim 14, wherein, when the user log-in information stores the token that is received from a cloud server that provides a service of the cloud-based application after encrypting the token, the managing of the log-in comprises displaying an application execution screen to the user.

16. The method of claim 14, wherein, when the user log-in information does not comprise a token that is received from a cloud server that provides a service of the cloud- based application, the managing of the log-in comprises displaying a screen for a log-in to a user account for the cloud-based application to the user.

17. The method of claim 14, wherein the user log-in information stores a user identification (ID) and a password for the user account for the cloud-based application, and when the user log-in information does not comprise a token that is received from a cloud server that provides a service of the cloud-based application, the managing of the log-in comprises automatically performing a log-in to the user account for the cloud-based application by transmitting the user ID and the password that are stored in the user log-in information to the cloud server.

18. A non-transitory computer-readable recording medium having recorded thereon a program for executing, the method comprising:

receiving an application execution command related to the cloud-based application from a user who logs into a user account for an image forming apparatus;

storing user log-in information in a database that corresponds to the cloud-based application, so as to match the user log-in information with the user account for the image forming apparatus;

managing the log-in to a user account for the cloud-based application by using the stored user log-in information;

when the user logs into the user account for the cloud-based application, receiving a token from a cloud server that provides a service of the cloud-based application, and encrypting the token for security;

wherein the storing of user log-in information comprises storing the encrypted token in the user log-in information, and wherein the managing of the log-in comprises maintaining the log-in to the user account for the cloud-based application by periodically transmitting the token that is stored in the user log-in information to the cloud server.

19. An image forming apparatus that communicates with a cloud server which provides application services, the image forming apparatus comprising: a user interface unit to display a screen and receive a user input;

a storage unit to store databases that correspond to respective applications that are installed in the image forming apparatus;

a control unit to store user log-in information in the databases corresponding to the respective applications, so as to match the user log-in information with a user account for the image forming apparatus, and to manage a log-in to a user account for each application by using the stored user log-in information;

a user log-in information managing unit to receive a token from the cloud server, encrypt the token, and store the encrypted token in the user log-in information that matches with the user account for the image forming apparatus, when the user, who logs into the user account for the image forming apparatus, logs into a user account for one of the applications, and a log-in maintenance managing unit to maintain the log-in status to the user account for the application by periodically transmitting the token that is stored in the user log-in information to the cloud server.

20. The image forming apparatus of claim 19, wherein, when the control unit receives an application execution command from the user who logs into the user account for the image forming apparatus, the control unit checks the user log-in information that matches the user account for the image forming apparatus from the database that corresponds to the application, and when the user log-in information includes a token, the control unit displays an application execution screen on the user interface unit.

* * * * *